United States Patent
Nagata et al.

(10) Patent No.: US 6,456,584 B1
(45) Date of Patent: Sep. 24, 2002

(54) OPTICAL INFORMATION RECORDING MEDIUM COMPRISING A FIRST LAYER HAVING A PHASE THAT IS REVERSIBLY CHANGEABLE AND A SECOND INFORMATION LAYER HAVING A PHASE THAT IS REVERSIBLY CHANGEABLE

(75) Inventors: Ken'ichi Nagata, Nishinomiya; Kenichi Nishiuchi; Noboru Yamada, both of Hirakata; Nobuo Akahira, Yawata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/311,635

(22) Filed: May 14, 1999

(30) Foreign Application Priority Data

May 15, 1998 (JP) .......................................... 10-132982

(51) Int. Cl.$^7$ ................................................. G11B 7/24
(52) U.S. Cl. ........................ 369/275.2; 369/283; 369/94
(58) Field of Search ............................. 369/94, 275.2, 369/283, 286; 430/270.13; 264/1.33

(56) References Cited

U.S. PATENT DOCUMENTS

| | | | |
|---|---|---|---|
| 5,126,996 A | 6/1992 | Iida et al. ................... | 369/283 |
| 5,194,363 A | 3/1993 | Yoshioka et al. | |
| 5,424,106 A | 6/1995 | Yamada et al. | |
| 5,431,978 A | 7/1995 | Nakamura et al. ...... | 369/283 X |
| 5,726,969 A | 3/1998 | Moriya et al. .......... | 369/286 X |
| 5,768,221 A | 6/1998 | Kasami et al. ............ | 369/94 X |

FOREIGN PATENT DOCUMENTS

| | | |
|---|---|---|
| EP | 319037 | 6/1989 |
| EP | 566107 A1 | 10/1993 |
| EP | 0 810 590 A2 | 12/1997 |
| EP | 0 825 595 | 2/1998 |
| JP | 5-282705 | 10/1993 |
| JP | 5-298747 | 11/1993 |
| JP | 7-262612 | 10/1995 |
| JP | 08-063781 | 3/1996 |
| JP | 09-198709 | 7/1997 |
| JP | 9-212917 | 8/1997 |
| WO | 96/31875 | 10/1996 |
| WO | 97/34298 | 9/1997 |

*Primary Examiner*—W. R. Young
(74) *Attorney, Agent, or Firm*—Wenderoth, Lind & Ponack, L.L.P.

(57) ABSTRACT

A multi-layer optical information recording medium has a first information layer located at the incident side for a laser beam and another information layer at the back thereof. Thus, it has a large capacity. A relationship that $R1a<R1c$ and $R2a<R2c$ holds for the reflectances $R1a$ and $R1c$ of the information layer in the in a recorded portion and in a non-recorded portion, and the reflectances $R2a$ and $R2c$ of the information layer in a recorded portion and in a non-recorded portion. A relationship that $A1a<A1c$ holds between the absorptances $A1c$ and $A1a$ of the first information layer in the crystalline state and in the amorphous state, similarly, a relationship $A2a<A2c$ holds between absorptances $A2c$ and $A2a$ of the second information layer in the crystalline state and in the amorphous state. Thus, signals can be written to the recording medium at a fast speed and at high sensitivity.

20 Claims, 7 Drawing Sheets

OPTICAL INFORMATION RECORDING MEDIUM COMPRISING A FIRST LAYER HAVING A PHASE THAT IS REVERSIBLY CHANGEABLE AND A SECOND INFORMATION LAYER HAVING A PHASE THAT IS REVERSIBLY CHANGEABLE

BACKGROUND OF THE INVENTION

1. Field of the Invention

The present invention relates to an optical information recording medium, especially an optical disk, for recording and reproducing a large capacity of information with a laser beam, and recording and reproduction therefor.

2. Description of Prior Art

A read-only optical recording medium with a laser beam includes optical disks called as a compact disk (CD), a laser disk (LD) and a digital video disk (DVD). Among the commercial read-only optical information recording media, a DVD disk can record signals at the highest density. According to the DVD format, a read-only DVD has diameter of 120 mm, and a user capacity of 4.7 GB at maximum for single layer type for single side reading, that of 9.4 GB for single layer type for double side reading, or that of 8.5 GB for two-layers type for single side reading. For example, a two-layers type DVD for single side reading has first and second information layers, and signals recorded in either of first and second information layers can be reproduced with a laser beam irradiated from one side of the optical disk. A method for fabricating a read-only DVD having a multi-layer structure is described for example in U.S. Pat. No. 5,126,996.

Optical information recording media which can record and reproduce signals with a laser beam include a phase-change type optical disk, a magneto-optical disk and a dye disk. In a phase-change type optical disk, a chalcogenide is used usually as a recording thin film material. Generally, when the recording thin film material is in the crystalline state, it is taken as a non-recorded state. A signal is recorded by irradiating a laser beam to melt the magnetic thin film material and to cool it quickly to the amorphous state. When a recorded signal is erased, a laser beam having a power lower than that for recording is irradiated to change the recording layer to the crystalline state. Because the chalcogenide magnetic thin film is formed with deposition in the amorphous state, it is necessary to crystallize all the surface of the recording region beforehand to result in the non-recorded state. This initial crystallization is usually included in a part of the disk manufacturing steps. A recording thin film is crystallized with a light source of a laser light source or a flash one.

In order to enhance the signal recording speed for a phase-change type optical disk on which recording and erasing are possible, so-called light absorption correction is proposed which is suitable for high linear speed recording (for example, Japanese Patent laid open Publication 5-298747/1993, Japanese Patent Publication 8-1707/1996, Japanese Patent laid open Publications 7-78354/1995 and 7-262612/1995). In all the proposals, the light absorptance of the recording thin film for the laser beam for recording is larger in the crystalline state than in the amorphous state of the recording thin film.

For an ordinary phase-change type optical disk without the optical absorption correction, the absorptance of the recording thin film for a laser beam for recording is smaller in the crystalline state than in the amorphous state. For such an optical disk, it is known that the temperature of the recording thin film attained on melting with the laser beam becomes higher in an area which was amorphous before the laser irradiation than in an area which was crystalline before the laser irradiation. This is ascribed to that latent heat is not needed to be supplied on melting from a starting point of the crystalline state but not so from a starting point of the amorphous state. It is also ascribed to that the amorphous state can be heated efficiently to a higher temperature because the thermal conductivity is lower in the amorphous state than in the crystalline state. Further, for an optical disk without the optical absorption correction, a large difference on the temperature attained on melting arises especially on high linear velocity recording. The reason is that a temperature rise effect other than the direct temperature rise due to laser irradiation, that is, temperature rise due to heat diffusion around the laser irradiation point, is smaller than the counterpart in low linear velocity recording. If the temperature attained on melting is changed according as the recording thin film was amorphous or crystalline before laser irradiation for recording, or according as it is a recorded mark or a non-recorded region, the shape of a recorded mark formed newly by overwriting is distorted, and good reproduction jitter cannot be obtained. The optical absorption correction is proposed for realizing good overwrite characteristic on high linear velocity recording by canceling the above-mentioned difference in temperature rise profile depending on whether the recording thin film is amorphous or crystalline.

Further, in order to increase the recording density of an optical disk on which recording is possible or an optical disk on which both recording and erasing are possible, so-called land and groove recording is proposed, wherein signals are recorded on grooves formed on the substrate surface and on lands between the grooves (for example, Japanese Patent laid open Publication 5-282705/1993).

Further, in order to increase the recording capacity of an optical disk on which both recording and erasing are possible, a two-layers structure is already proposed wherein information is read from one side thereof (for example, Japanese Patent laid open Publication 9-212917/1997). The optical disk of two-layers structure has two phase-change recording films, and information is read or erased in each of the recording films by irradiating a laser beam from one side of the optical disk. The recording capacity is increased twice by using two recording films. As to the initialization of an optical disk of the two-layers structure, it is proposed to shorten the initialization time by irradiating the two recording layers at the same time (for example, Japanese Patent laid open Publication 9-91700/1997).

Though the idea of the two-layers structure of an optical disk on which both recording and erasing are possible is already proposed (for example, Japanese Patent laid open Publication 9-212917/1997) in order to enhance the recording capacity, it has not yet been used practically because following problems are not solved. Hereinafter, "first information layer" denotes a recordable layer positioned at the front side viewed from the incident laser beam for recording and reproduction, and "second information layer" denotes a recordable layer positioned at the back side viewed from the incident laser beam.

1) A structure of the first information layer is not known, that has high transmittance, and high recording sensitivity at a laser beam wavelength for recording, erasing and reproducing signals, that enables land and groove recording, and that has a good repetition characteristic of recording and erasing.

2) A structure of the second information layer is not known, that has high recording sensitivity and sufficiently high reflectance at non-recorded portions at a laser beam wavelength for recording, erasing and reproducing signals, that enables land and groove recording, and that has a good repetition characteristic of recording and erasing.

3) A structure of the two-layers optical disk is not known that enables high speed overwriting to the first and second information layers.

4) In the initial crystallization of the optical recording medium having two layers of phase-change recording thin films, the sensitivity of the initial crystallization is different among the first and second information layers, and it is necessary to perform the initialization at different initialization conditions. Though the initialization with focus servo for each information layer is proposed (for example, Japanese Patent laid open Publication 9-91700/1997), this needs an optical system having the focal depth narrower than the thickness of the separation layer. Therefore, this is a problem for an apparatus for high speed initialization by laser irradiation over a large area.

5) The transmittance of the first information layer is different between when signals are recorded and when signals are not recorded. Therefore, the amplitude of reproduced signals for the second information layer is different between the two cases. This causes read errors for the second information layer. Further, the recording sensitivity is different between the two cases, and an optimum recording power for the second information layer cannot be determined.

6) For a recordable optical information recording medium with a multi-layer structure, the transmittance of the first information layer has to be high in order to reproduce signals from the second information layer. Recording for the first information layer is not possible if the absorptance of the first information layer is not high to a certain extent. Then, the reflectance of the first information layer becomes low necessarily. Then, it becomes difficult to reproduce signals recorded in the first information layer well.

7) Because the signals recorded in the second information layer is reproduced with a light which transmits the first information layer which absorbs light twice, the reproduction signals are very small. Therefore, it is difficult to reproduce signals recorded in the second information layer.

SUMMARY OF THE INVENTION

A main object of the invention is to provide an optical information recording medium with a multi-layer structure, a recording or reproduction method therefor, and an optical information reproduction apparatus which solves the above problems.

In one aspect of the present invention, an optical information recording medium comprises a first information layer including a first recording layer to which information can be recorded by causing reversible phase change between crystalline and amorphous states by exposure to a light beam, and a second information layer including a second recording layer to which information can be recorded by causing reversible phase change between crystalline and amorphous states by exposure to the light beam. As to the two information layers, a relationship that $R1a<R1c$ and that $R2a>R2c$ holds between reflectance Rc of the first information layer when the first recording layer is in the crystalline state, reflectance $R1a$ of the first information layer when the first recording layer is in the amorphous state, reflectance $R2c$ of the second information layer when the second recording layer is in the crystalline state, and reflectance $R2a$ of the second information layer when the second recording layer is in the amorphous state. Preferably, in the optical information recording medium, a relationship that $A1a<A1c$ holds between absorptance $A1c$ of the first information layer when the first recording layer is in the crystalline state, and absorptance $A1a$ of the first information layer when the first recording layer is in the amorphous state. Similarly, in the optical information recording medium, a relationship that $A2a<A2c$ holds preferably between absorptance $A2c$ of the second information layer when the second recording layer is in the crystalline state, and absorptance $A2a$ of the second information layer when the second recording layer is in the amorphous state.

In a second aspect of the invention, an optical information recording medium comprises a first information layer including a first recording layer to which information can be recorded by causing reversible phase change between crystalline and amorphous states by exposure to a light beam, and a second information layer including a second recording layer to which information can be recorded by causing reversible phase change between crystalline and amorphous states by exposure to the light beam. As to the two information layers, a relationship that $A1a<A1c$ and that $A2a<A2c$ holds between the absorptances $A1c$, $A1a$, $A2c$ and $A2a$. Preferably, in the optical information recording medium, a relationship that $R1a<R1c$ holds between the reflectances $R1c$ and $R1a$. Similarly, in the optical information recording medium, a relationship that $R2a>R2c$ holds preferably between the reflectances $R2c$ and $R2a$.

In a third aspect of the invention, when an optical information recording medium is fabricated, initial crystallization is performed before the adherence of the two information layers. That is, there are provided first and second information layers including first and second recording layers respectively to which information can be recorded by causing reversible phase change between crystalline and amorphous states by exposure to a light beam. Then, at least one of the first and second information layers is subjected to initial crystallization, and the first and second information layers are adhered.

In a fourth aspect of the present invention, an optical information recording medium comprises a first information layer including a first recording layer to which information can be recorded by exposure to a light beam, an intermediate transparent layer formed on the first information layer, a second information layer including a second recording layer to which information can be recorded by exposure to a light beam, and an overcoat layer formed between the first information layer and the intermediate transparent layer or between the second information layer and the intermediate transparent layer. By providing at least one overcoat layer, the repetition characteristics of recording can be improved.

In a fifth aspect of the invention, an optical information recording medium comprises a first recording layer to which information can be recorded by exposure to a light beam; and a second recording layer to which information can be recorded by exposure to a light beam which transmits the first recording layer. The first recording layer includes a region wherein recorded marks have been formed. The marks are formed so that the first recording layer has about the same transmittance as that in an area where signals are recorded.

In a sixth aspect of the invention, when information is recorded in a second recording layer in a multi-layer optical information recording medium, a reproduction position is set for the recording medium, and it is decided whether signals have been recorded in the first recording layer in front of the reproduction position. Then, signals are recorded to the second recording layer with a laser beam that is transmitted through the first recording layer only when signals are decided to be recorded in the first recording layer in front of the reproduction position.

In a seventh aspect of the invention, when information recorded in first and second layers in an optical information recording medium is reproduced, it is decided whether signals are reproduced from the first recording layer or from the second recording layer. Then, signals recorded in the first recording layer are reproduced with a laser beam of a first power, and signals recorded in the second recording layer are reproduced with a laser beam that transmits through the first recording layer and that has a second power higher than the laser beam of the first power. Thus, an apparatus for reproducing signals from a multi-layer optical information recording medium having the first and second recording layers comprises a rotation driver which supports and drives the multi-layer optical information recording medium, an optical head comprising a light source, which emits a light to the recording medium rotated by the rotation driver, a detector, which detects light reflected from the recording medium, and a controller, which makes the light source emits the light beam having a first power when signals are reproduced from the first recording layer or having a second power higher than the first power when signals are reproduced from the second recording layer.

In an eighth aspect of the invention, when signals are reproduced from a first multi-layer optical information recording medium having two recording layers to which recording and reproduction are performed with a light beam from a side of the recording medium and from a second read-only optical information recording medium, it is discriminated whether the optical information recording medium to be reproduced is the first or second optical information recording medium. Then, signals are reproduced from the second optical information recording medium with a laser beam of a first power when the second optical information recording medium is discriminated, and from the first optical information recording medium with a laser beam of a second power higher than the first power when the first optical information recording medium is discriminated. Thus, an apparatus for reproducing signals from the first and second optical information recording medium comprises a rotation driver, which supports and drives the first or second optical information recording medium having the first or second recording layer, an optical head comprising a light source, which emits a light beam to the first or second optical information recording medium, a detector, which detects light reflected from the first or second optical information recording medium, and a controller, which makes the light source in the optical head emit the light beam having a first power when signals are reproduced from the second optical information recording medium or having a second power higher than the first power when signals are reproduced from the first optical information recording medium.

The above object is solved by the combinations of the characteristics described in the main claims, and the subclaims define further advantageous embodiments of the invention, and this summary of the invention does not necessarily describe all necessary features so that the invention may also be a sub-combination of these described features.

An advantage of the present invention is that an optical information recording medium can record data in two information layers from one side and has a large storage capacity.

Another advantage of the present invention is that signals can be recorded well to, and reproduced from, a multi-layer optical information recording medium.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
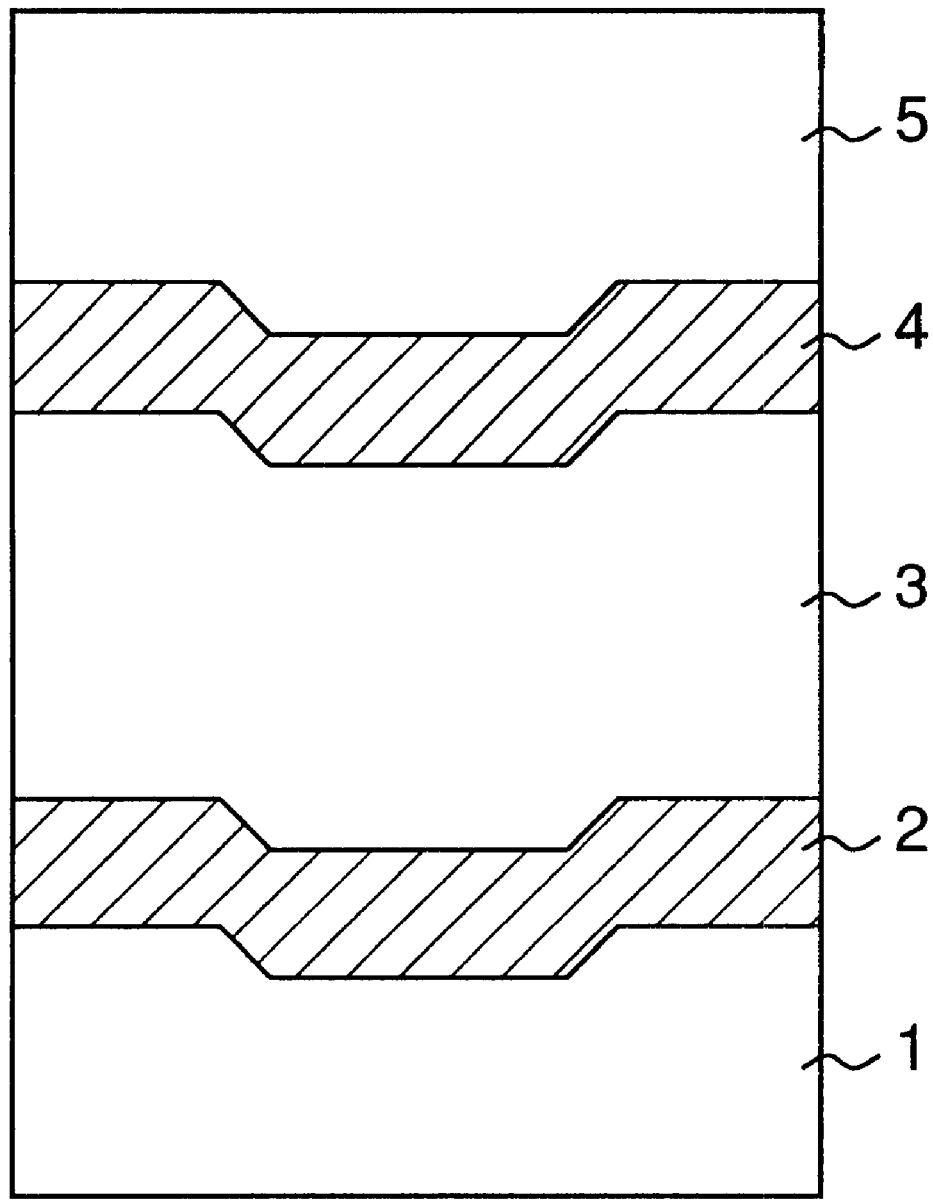
FIG. 1 is a sectional view of a structure of a two-layers read-only optical disk of a first embodiment of the invention.

Referring now to the drawings, wherein like reference characters designate like or corresponding parts throughout the several views, FIG. 1 is a sectional view in a radial direction of a layered structure of a multi-layered optical information recording medium (optical disk) of an embodiment of the invention. The optical disk has a plurality of information layers. As shown in FIG. 1, a substrate 1, a first information layer 2, an optical separation layer 3, a second information layer 4 and another substrate 5 are layered successively. The two information layers 2 and 4, layered via the optical separation layer 3, have recorded thin films (not shown), and information can be recorded in the two information layers 2 and 4.

Figure 2:
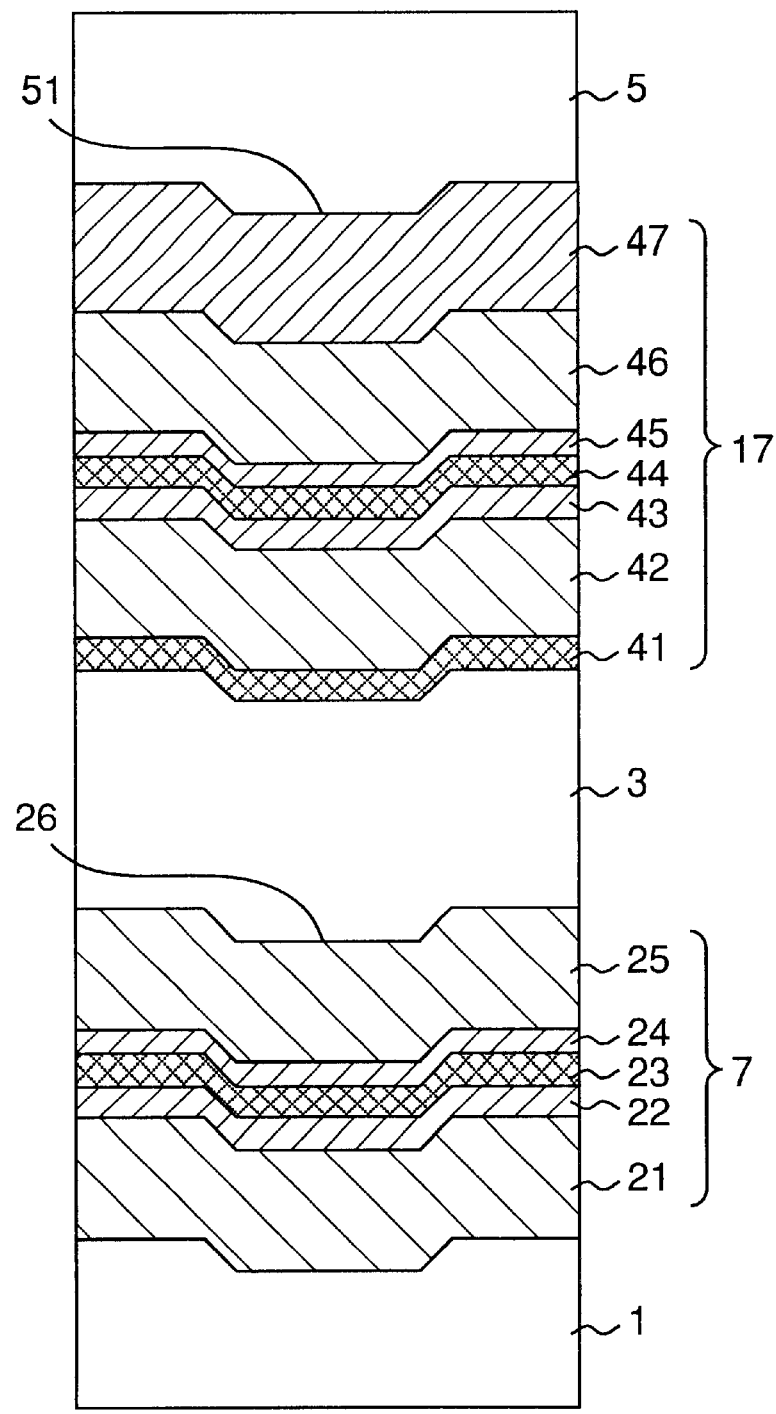
FIG. 2 is a sectional view for illustrating a structure of first and second information layers in detail.

FIG. 2 shows an example of the structure of the first information layer 2 and the second information layer 4. The first information layer 2 comprises a protection layer 21, an interface layer 22, a first recording layer 23, another interface layer 24 and another protection layer 25 layered successively. Further, the second information layer 4 comprises a semitransparent layer 41, a protection layer 42, an interface layer 43, a second recording layer 44, another interface layer 45, another protection layer 46 and a reflection layer 47 layered successively. A laser beam for recording and reproduction is incident from the side of the substrate 1.

The components in the multi-layers optical information recording medium is explained below. The substrate 1 is made of a resin plate such as polycarbonate or polymethyl methacrylate, or an ultra-violet rays setting resin, a glass plate or a transparent inorganic thin film. The surface 26 of the substrate is covered with a spiral continuous groove or coaxial continuous grooves (guide grooves, tracks). The substrate 1 may also be formed with spin coating. For example, after the second information layer 4 is deposited on the protection substrate 5, the optical separation layer 3 covered with a continuous spiral groove or continuous concentric grooves (guide grooves, tracks) is formed with 2P process. Further, the first information layer 2 is deposited on the surface of the optical separation layer covered with the grooves. Then, the substrate 1 is formed with spin coating. In this case, the thickness of the substrate 1 is usually about a few tens micrometers or less.

It is desirable for the protection layers 21, 25, 42 and 46 to be made of a material that is physically and chemically stable, or that has a melting point and softening temperature higher than the melting point of the recording materials of the first and second recording layers 23 and 44, and that is not soluble with the recording materials so that it will not form a solid solution. For example, it is a dielectric material of $Al_2O_3$, $SiO_x$, $Ta_2O_5$, $MoO_3$, $WO_3$, $ZrO_2$, ZnS, $AlN_x$, BN, $SiN_x$, TiN, ZrN, $PbF_2$, or $MgF_2$, or a combination thereof. However, the material for the protection layers 21, 25, 42 and 46 are not needed to be a dielectric material or to be a transparent material. For example, it may be made of ZnTe, or the like, which can absorb visible rays and ultraviolet rays. If the protection layers 21 and 25 are made of a different material from the protection layers 42 and 46, it is advantageous that the freedom of disk design is expanded thermally and optically. Of course, they may be the same material.

The interface layers 22, 24, 43 and 45 are provided in order to suppress mutual migration of constituent elements in the adjacent layers. The first recording layer 23 is interposed by two protection layers (dielectric layers) 21 and 25, and the interface layer 22, 24 is provided at least between the first recording layer 23 and the protection layer 21 or between the first recording layer 23 and the protection layer 25. The second recording layer 44 is interposed by two protection layers (dielectric layers) 42 and 46, and the interface layer 43, 45 is provided at least between the second recording layer 44 and the protection layer 42 or between the second recording layer 44 and the protection layer 46. Each of the interface layers 22, 24, 43 and 45 is made of a nitride or carbide, and for example, a material having a general formula of X—N, X—O—N. Preferably, but not necessarily, X is at least one of Ge, Cr, Si, Al or Te. By providing the interface layers, mutual diffusion is suppressed between constituent elements in the first and/or second recording layer 23, 44 and those in the dielectric layers of the protection layers 21, 25, 42 and 46, and the repetition characteristic of recording and erasing is improved. The advantage of the interface layer is described in detail for example in Japanese Patent laid open Publication 4-52188/1992. Further, it is explained later with reference to dummy recording.

Materials of the first recording layer 23 included in the first information layer 2 and that of the second recording layer 44 included in the second information layer 4 are materials which change their structures between the crystalline and amorphous states. For example, the materials are phase change materials having a main component of Te, In, Se, or the like. The main components of known phase change materials are, for example, Te—Sb—Ge, Te—Ge, Te—Ge—Sn, Te—Ga—Sn—Au, Sb—Se, Sb—Te, Sb—Se—Te, In—Te, In—Se, In—Se—Tl, In—Sb, In—Sb—Se, In—Se—Te. The first and second recording layers 23 and 44 are deposited as thin films usually in the amorphous state. By absorbing energy of a laser beam, or the like, it is crystallized to change optical constants (index of refraction n and attenuation coefficient k). A material having a good repetition characteristic for recording and reproducing signals, and its material composition have been experimentally sought. It is found that a material including three elements of Ge, Sb and Te is good. If the atomic ratio thereof is expressed as $Ge_xSb_yTe_z$, it is preferable that $0.10 \leq x \leq 0.35$, $0.10 \leq y \leq 0.65$, and $0.45 \leq z \leq 0.65$ where $x+y+z=1$.

The optical separation layer 3 is an intermediate layer arranged between the first information layer 2 and the second information layer 4. It is provided to make the effect of reproduction of signals from the other layer negligibly small when the first or second information layer 2, 4 is reproduced. The thickness thereof is usually between 10 and 100 micrometers, preferably between 30 and 60 micrometers. The material of the optical separation layer 3 is transparent at the wavelength of the laser beam irradiating for recording or reproducing signals to, or from, the second information layer 4. It may have a function for optically separating the first and second information layers 2 and 4. For example, the material is an ultraviolet rays setting epoxy resin, or a double-sided tape for adhesion of an optical disk (for example, adhesion sheet DA-8320 of Nitto Kogyo KK).

The optical separation layer 3 is formed with spin coating, 2P process, or the like. It can be formed with a 2P process in two ways. In a first case, after the first information layer 2 is deposited on the substrate 1, the optical separation layer 3 covered with a continuous spiral groove or continuous concentric grooves (guide grooves, tracks) is formed with a 2P process. Further, the second information layer 4 is deposited thereon. In this case, the protection substrate 5 is not needed. In a second case, after the second information layer 4 is deposited on the protection substrate 5, the optical separation layer 3 covered with a continuous spiral groove or continuous concentric grooves (guide grooves, tracks) is formed with a 2P process. Further, the first information layer 2 is deposited on the surface of the optical separation layer covered with the grooves. In this case, the substrate 1 is formed with spin coating.

The semitransparent layer 41 is made from a metallic element such as Au, Al or Si as a main element or an alloy thereof. It is preferably provided in order to facilitate a structure of optical absorption correction at the second recording layer 44 in the second information layer 4, but it is not necessarily provided. In order to enhance the recording sensitivity of the second information layer 4, the thickness of the semitransparent layer 41 is between 100 and 4 nanometers. An optical characteristic similar to that of the semitransparent layer 41 can be realized by layering two kinds of dielectric layers having different indices of refraction instead of the semitransparent layer 41.

The reflection layer 47 is made from a metallic element such as Au, Al, Ni, Fe or Cr as a main element or an alloy thereof. It is preferably provided in order to enhance optical absorption efficiency at the second recording layer 44.

The protection substrate 5 is made of, for example, a resin layer formed with spin coating, or a resin or glass plate similar to the substrate 1. When guide grooves for the second information layer 4 are formed on the surface of the optical separation layer 3 with a 2P process, the surface of the protection substrate 5 is flat, and it may be adhered with an adhesive on the second information layer 4. If grooves for the second information layer 4 are not formed on the surface of the optical separation layer 3, a spiral continuous groove or concentric grooves (guide grooves, tracks) are formed on the surface 51 of the protection substrate 5. In this case, the second information layer 4 is formed directly on the surface 51 of the protection substrate 5, and it is adhered via the optical separation layer 3 with the first information layer 2.

Further, an optical information recording medium may be constructed from two two-layered optical information recording media by adhering the two first information layers 2 with an adhesive. In the four-layered optical information recording medium, recording and reproduction are possible from the two sides.

The above-mentioned first recording layer 23, the second recording layer 44, the protection layers 21, 25, 42 and 46, the interface layers 22, 24, 43 and 45, the semitransparent layer 41, the reflection layer 47, and the like, are usually formed by electron beam deposition, sputtering, ion plating, chemical vapor deposition, laser sputtering, or the like.

Next, the basic structure of the first information layer 2 is explained. The most important characteristics desired for the first information layer 2 are a high transmittance, a high sensitivity, a structure promoting optical absorption correction that provides high speed overwrite, and a reflectance large to some extent for non-recorded regions. In order to increase the transmittance, no light absorbing layers, such as a reflection layer, have to be provided other than the first recording layer 23.

As mentioned above, in the optical absorption correction structure, the light absorptance "A1a" of the first information layer 2 having the first recording layer 23 in the amorphous state is lower than the light absorptance "A1c" of the first information layer 2 having the first recording layer 23 in the crystalline state (A1a<A1c). For a structure of an ordinary disk without the optical absorption correction, or for a structure where the light absorptance of the first information layer 2 is higher for the first recording material in the amorphous state than in the crystalline state, it has been experimentally determined that an erasing characteristic is not sufficient at a recording linear velocity exceeding 6 m/s. Usually the wavelength of the laser beam for recording is the same as that for reproduction. Then, it is assumed below that the recording and reproducing laser beams have the same wavelength.

In order to increase the average transmittance in the amorphous state, and in the crystalline state, to enhance the average recording sensitivity, it is necessary that one of the reflectance in the first information layer 2, in the second information layer 4, in both the amorphous state and in the crystalline state, approach zero as close as possible. On the other hand, if a non-recorded region does not have high reflectance to some extent, the focus and tracking servo characteristics cannot be obtained. If an address region consisting of a pit array is formed at the surface of the substrate 1, the address signal cannot be reproduced. As mentioned above, in a rewriteable optical disk using a phase-change material as the first recording material, a crystalline region corresponds to a non-recorded region and an amorphous region corresponds to a recorded mark. Therefore, it is impossible for the reflectance in the first information layer 2, having the first recording layer 23 in the crystalline state, to approach zero. Therefore, the reflectance in the first information layer 2, having the first recording layer 23 in the amorphous state, has to approach zero as close as possible. That is, the reflectance "R1c" of a recording region where the recording thin film is in the crystalline state has to be higher than the reflectance "R1a" of a non-recorded region where the recording layer is in the amorphous state (R1a<R1c).

Further, in order for the first information layer 2 to have a structure suitable for land and groove recording, a following relationship is derived from an optical simulation for a laser beam to irradiate through the first substrate 1 to reproduce signals recorded in the first information layer 2:

$$(2n-1)\pi < \phi 1a - \phi 1c < (2n+0.1)\pi,$$

where $\phi 1a$ is a phase of the reflected light from the first information layer 2 when the first recording layer 23 is in the amorphous state, and $\phi 1c$ is a phase of the reflected light from the first information layer 2 when the first recording layer 23 is in the crystalline state. For example, the first recording layer 23 is made of Ge—Sb—Te (Ge:Sb:Te= 4:3:7) of thickness of 7 nm. Further, the protection layer 21 of ZnS—20 mol % $SiO_2$ layer of thickness of 100 nm is provided at the side of the substrate 1 for the first information layer 2 and the protection layer 25 of thickness of 110 nm is provided at the side opposite to the substrate 1. It is confirmed that the above relationship is satisfied, and that repetition of recording and erasing is good. These results will be explained later in examples.

Next, the structure of the second information layer 4 is explained. The most important characteristics desired for the second information layer 4 are a high sensitivity, a high reflectance, a structure promoting optical absorption correction, which provides high speed overwrite recording. As mentioned above, in the structure promoting optical absorption correction, the light absorptance "A2a" of the second information layer 4 for the second recording layer 44 in the amorphous state is lower than that "A2c" in the crystalline state. For a structure of an ordinary disk without the optical absorption, or for a structure where the light absorptance of the second information layer 4 is higher for the second recording material in the amorphous state than in the crystalline state, it has been experimentally determined that an erasing characteristic is not sufficient at a recording linear velocity exceeding 6 m/s. In order to improve the average recording sensitivity in the amorphous and crystalline states, it is better for the transmittance of the second information layer 4 to be as small as possible. That is, it is desirable that the laser beam incident on the second information layer 4 is absorbed mainly by the second recording layer 44 and that the remainder is reflected as much as possible. In order to realize the optical absorption correction, in the second information layer 4, the optical absorptance "A2a" of the second recording layer 44 is smaller in the amorphous state than that "A2c" in the crystalline state. In order to use the incident light efficiently, it is desirable that the reflectance "R2a" in the amorphous state of the second recording layer 44 is larger than that "R2c" in the crystalline state (R2a>R2c).

Further, in order for the second information layer 4 to have a structure suitable for land and groove recording, a following relationship is derived from an optical simulation for a laser beam irradiated through the first substrate 1 to reproduce signals recorded in the second information layer 44:

$$(2n-1)\pi < \phi 2a - \phi 2c < (2n+0.1)\phi,$$

where $\phi 2a$ is a phase of the reflected light from the second information layer 4 when the second recording layer 44 is in the amorphous state, and $\phi 2c$ is a phase of the reflected light from the second information layer 4 when the second recording layer 44 is in the crystalline state. For example, the second information layer 4 has the semi-transparent layer of Au, the protection layer 42 of ZnS—20 mol % $SiO_2$, the recording layer 44 of Ge—Sb—Te (Ge:Sb:Te=4:2.7:7), the protection layer 46 of the ZnS—20 mol % $SiO_2$ and the reflection layer 47 of Al—2 at % Cr of thicknesses of 10, 70, 10, 80 and 16 nm, layered successively in this order on the optical separation layer 3. It is confirmed that this second information layer 4 satisfies the above conditions, and recording and erasing can be repeated well.

The optical characteristics of an optical information recording medium including the first and second information layers 2, 4 are explained above. In the current situation where the laser power is limited, as mentioned above, in a recordable optical disk with the multi-layer structure, the first information layer 2 located in the front side with respect to the incident direction of the laser light, has a reflectance that becomes smaller after recording, and the second information layer 4 located in the back side, with respect to the incident direction of the laser light, has a reflectance that becomes larger after recording (that is $R1a<R1c$ and $R2a>R2c$). Then, a recording medium which can be practically used, can be provided. In this case, a drive for reproducing the recording signals has to reproduce the two layers having reverse directions of the change in reflectance due to recording. Of course, when the laser power is increased largely in the future, for example, the reflectance of the second information layer can be set to decrease due to recording, or the reflectance change characteristics of the two layers become the same. Preferably, the optical absorptance of the first recording layer 23 in the first information layer 2 satisfies the relationship of $A1a<A1c$. Further, preferably, the optical absorptance of the second recording layer 44 in the second information layer 4 satisfies the relationship of $A2a<A2c$. Most preferably, the first and second information layers satisfy the relationships of $R1a<R1c$, $R2a>R2c$, $A1a<A1c$ and $A2a<A2c$.

In a different approach, an optical information recording medium including the first and second information layers 2, 4 satisfies the relationships on the optical absorptance of $A1a<A1c$ and $A2a<A2c$. Then, a recording medium which can be used practically can be provided. Preferably, the reflectance of the first information layer 2 satisfies the relationship of $R1a<R1c$, or preferably, the reflectance of the second information layer 4 satisfies the relationship of $R2a>R2c$.

Next, a second embodiment of the invention is explained. In the initial crystallization for an optical information recording medium having two layers of phase-change type recording thin film, the sensitivity for the initial crystallization is usually different among the first and second information layers. Therefore, the initialization has to be performed in different conditions. It is proposed for each of the first and second information layers to be initialized with a focus servo (for example, Japanese Patent laid open Publication 9-91700/1997), but this needs an optical system having deeper focal depth than the thickness of the separation layer. This is a problem when an initialization apparatus is produced for high speed initialization by irradiating a laser beam over a large area.

Then, before the first information layer 2 is adhered via the optical separation layer 3, at least one of the recording layers (thin films) in the first and second information layers 2 and 4 is initialized with an apparatus for the initial crystallization. In the new initialization method, when a two-layers optical information recording medium is fabricated, the first information layer 2 including the recording layer is formed on the substrate 1. Similarly, the second information layer 4 including the recording layer is formed on the protection substrate 5. The uneven pattern of spiral or concentric continuous grooves (guide grooves, tracks) are formed for example on the substrates 1 and 5. Then, before adhering them via the optical separation layer 3, at least one of the recording layers in the first and second information layers 2 and 4, for example, the recording layer in the second information layer, is initialized with a laser initialization apparatus. Next, the two information layers 2 and 4 are adhered via the optical separation layer 3. According to this method, the recording layers can be initialized in the initial crystallization conditions for each of the information layers 2, 4, by using the apparatus of a relatively low cost having a wide depth of focus.

Because the first information layer 2 has high transmittance, it may be subjected to the initial crystallization by entering the laser light from the side of the substrate 1, or from the side of the first information layer 2 without transmission through the substrate 1. On the other hand, because the second information layer 4 has high transmittance, the initial crystallization is usually difficult to accomplish by transmitting light through the protection substrate 5. The information layers 2, 4 on the two substrates subjected to the initialization are opposed and adhered to each other, for example, by using an epoxy ultraviolet rays setting resin and irradiating with ultraviolet rays. In this case, the adherence layer becomes the optical separation layer 3. The thickness thereof is set so that an effect of reproduction signals by the other layer is negligibly small when the first or second information layer 2, 4 is reproduced and so that it is as small as possible.

In processes where after the first and second information layers 2, 4 are adhered to each other, they are subjected to the initial crystallization with an apparatus of a relatively low cost having larger depth of focus than the thickness of the optical separation layer 3. A problem arises, especially for one of them having relatively low sensitivity for the initial crystallization. If the layer of relatively low sensitivity is initialized with a sufficiently large power, the layer of high sensitivity receives an excessive power larger than the optimum condition, and in a bad case, is destroyed. Therefore, one of them having relatively low sensitivity may be subjected to the initial crystallization before the adherence, and the other layer of high sensitivity may be subjected to the initial crystallization after the adherence. The magnitude of the crystallization sensitivity of each information layer depends on the structure thereof and the wavelength of the laser used for the initial crystallization.

Next, a third embodiment of the invention is explained. When at least one of the first and second information layers 2 and 4 is subjected to the initial crystallization before adherence, it is found that the repetition characteristic on recording and reproduction is not sufficient for the information layer subjected to the initial crystallization before adherence. It is suggested that a phenomenon that the repetition characteristic on recording and reproduction is deteriorated due to deterioration of thermal deformation of the substrate, or the like, because heat is accumulated unnecessarily in the information layer when the initial crystallization is performed in an air environment having small thermal conductivity. As such, in an exemplary embodiment of the present invention, the surface of the information layer to be initialized with the overcoat layers is covered. Consequently, the repetition characteristic on recording and reproduction is improved.

Figure 3:
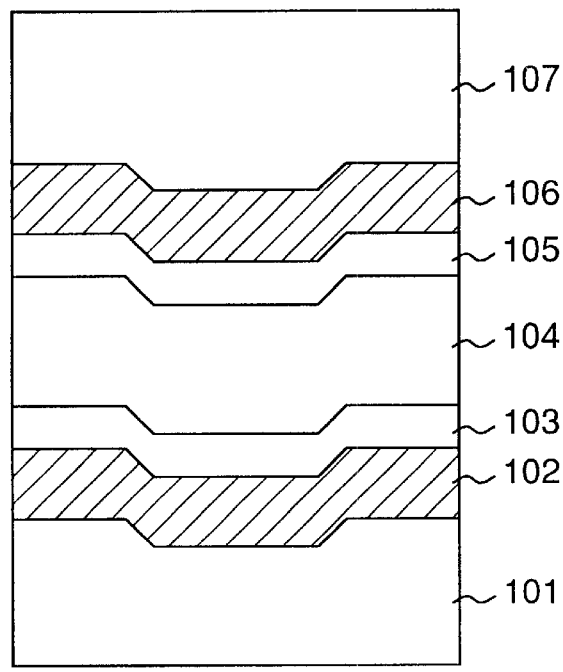
FIG. 3 is a sectional view of a structure of a two-layers read-only optical disk of a second embodiment of the invention.

FIG. 3 shows a multi-layer optical information recording medium (optical disk). The optical disk comprises a substrate 101, a first information layer 102, an overcoat layer 103, an optical separation layer 104, another overcoat layer 105, a second information layer 106 and another substrate 107 layered successively. The two information layers 102 and 106 layered via the optical separation layer 104 have recording thin films (not shown), and information can be recorded in the two information layers 102 and 106. For example, the substrates 101, 107, the two information layers 102, 106 and the optical separation layer 104 have the same structures as the counterparts in the first embodiment. The optical disk has two overcoat layers 103 and 105, but only one of them may be provided.

The overcoat layer 103, 105 is formed for example by spin coating of an acrylic ultraviolet-rays setting resin and by exposure to ultraviolet-rays. It can be said that the overcoat layers 103, 105 and the optical separation layer 104 correspond to an intermediate layer consisting of a plurality of layers arranged between the two information layers 102 and 106. The total thickness of the overcoat layers 103, 105 and the optical separation layer 104 is selected so that the an effect of reproduction signals from the other information layer becomes negligibly small when one of the first and second information layers is reproduced, and that the total thickness becomes as small as possible. In order to improve the uniformity of the film thickness of the overcoat layer in the disk plane, it is found that the overcoat layer desirably has thin thickness equal to or smaller than 10 $\mu$m. As a technique to attain this, for example, the overcoat layer is made of a resin having lower viscosity than the optical separation layer 104. Experimental data shows that the repetition characteristic of recording and reproduction is improved much by performing the initial crystallization after the overcoat layers 103 and 105 are formed and by adhering them via the optical separation layer 104 thereafter.

In a fabrication method, the first information layer 102 is formed on the substrate 101 having an uneven pattern, the optical separation layer 104 having an uneven pattern is formed on the first information layer 102 with 2P process or the like, and the second information layer 106 is formed on the optical separation layer 104. In the method, according to the same reasons, after the first information layer 102 is formed, the overcoat layer 103 is formed thereon, and the first information layer 102 is subjected to the initial crystallization. Then, the optical separation layer 104 and the second information layer 106 are formed successively. Finally, the second information layer 106 is subjected to the initial crystallization. Such a fabrication method for an optical disk is advantageous naturally when the first information layer has the sensitivity of the initial crystallization smaller than that of the second one.

Next, a multi-layer optical information recording medium (optical disk) of a fourth embodiment of the invention is explained. In a multi-layer optical information recording medium having a recordable first information layer and at least a second information layer at the back of the first one with respect to the incidence of laser beam, it is explained next what problem arises due to the transmittance of the first information layer different between non-recorded states and recorded states.

When signals recorded in the second information layer are reproduced, the amplitude of the signals reproduced from the second information layer depends on whether signals are recorded in the first layer at the front of a region of the second information layer to be reproduced. For example, if $T_{nr}$, denotes transmittance when signals are not recorded in the first information layer and $T_r$ denotes transmittance when signals are recorded in the first information layer, the amplitude of reproduced signals of the second information layer when signals are recorded in the first information layer is $(T_{nr}/T_r)*(T_{nr}/T_r)$ times the amplitude of reproduced signals of the second information layer when signals are not recorded in the first information layer. That is, it is proportional to a square of the transmittance of the first information layer. If signals can be recorded in the second information layer, the recording sensitivity of the second information layer is affected if signals are recorded in the first recording layer. That is, the recording sensitivity of the second information layer when signals are recorded in the first recording layer is $(T_{nr}/T_r)$ times that when signals are not recorded in the first recording layer.

In order to solve such disadvantages, a multi-layer optical information recording medium according to the fourth embodiment of the invention has pre-recorded marks that are recorded beforehand. The pre-recorded marks denote recorded marks formed so as to have about the same transmittance as that in an area where ordinary signals are recorded. For example, dummy signals are recorded beforehand in a recordable first information layer 2. It is sufficient that dummy signals are recorded so as to have about the same transmittance as ordinary signals. Of course, various advantages are realized if the dummy signals are recorded in the first information layer 2 so as to be reproduced, but they are not necessarily required to be reproduced.

An important point is a ratio of an area wherein dummy signals are recorded to an area where they are not recorded. The above problem is solved fully if the ratio is about the same as a ratio of an area wherein signals are recorded to an area where they are not recorded when signals are recorded in the first information layer without vacant sites. Even when signals are recorded in the first information layer 2 at the maximum density, the area occupied by the recorded marks do not exceed 50%. Further, it is experimentally confirmed that when the area occupied by the recorded marks is less than 20%, the advantage of the embodiment is not attained sufficiently.

Dummy signals can be recorded in various ways. For example, they may be recorded in recordable tracks with a weak recording power like a DC signal. They may be recorded in every other track with an ordinary recording power like a DC signal. Recorded marks of a constant period may be recorded in recordable tracks. Signals may be recorded so as to be able to derive information therefrom, as mentioned above.

Figure 4:
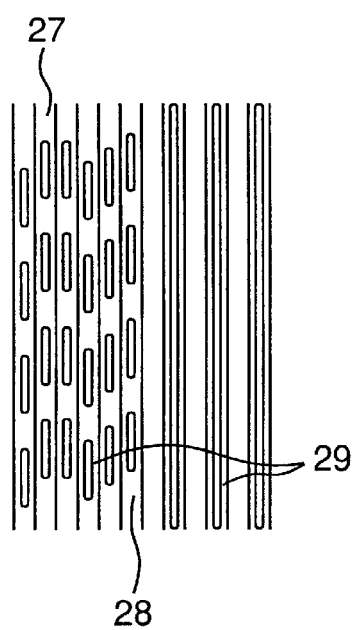
FIG. 4 is a diagram of an example of dummy signals recorded in a part of an optical disk.

FIG. 4 shows an example where the recorded marks are recorded to occupy an area of 30% per unit area. Recorded marks (amorphous state) 29 are recorded in non-recorded region (crystalline state) 28 in the guide grooves (tracks) 27 formed in parallel. In the drawing, signals are recorded without vacant site in the six guide grooves 27 at the left side. On the other hand, signals are not recorded in the six guide grooves at the right side, and dummy signals are recorded beforehand therein. In the example, the dummy signals are recorded every recordable track as a DC signal with an ordinary recording power.

Especially, if the second information layer is a medium on which recording, erasing and reproduction are possible, it is very important to secure the recording power margin. Therefore, the advantage of the embodiment is exploited to the maximum when the first and second information layers 2, 4 have phase-change type recording thin films on which recording and erasing are possible. The reason is that the quality of reproduced signals for the optical information recording medium having the phase-change type recording thin film depends on the change in reflectance for each of the first and second information layers and on the transmittance of the first information layer 2 at the laser incidence side.

It is not easy to realize the first information layer 2, which has sufficiently large transmittance and on which recording and erasing are possible. We find that the above characteristic is satisfied for the first information layer 2 having the structure shown in FIG. 2, wherein the recording layer 23, made of Ge—Sb—Te recording material of an appropriate composition, has thickness between 5 and 9 nm, without any other layer having an absorption coefficient equal to or larger than 1.0, except the recording material. Especially, the repetition characteristic for recording and reproducing is very good for a structure when the interface layer 22 and/or 24 (especially, the nitride interface layer 22) is provided along the first information layer 2. Details thereof will be explained later in examples.

However, the above-mentioned advantage of the multi-layer optical information recording medium having dummy signals recorded in the first information layer can be applied not only to the phase-change type optical disk, but also to any recordable multi-layer optical information recording medium. Especially, the advantage can be obtained in an optical information medium having a recording thin film made of a magneto-optical recording material or a recordable organic dye material.

Next, a fifth embodiment of the invention is explained. It is assumed that dummy signals are not recorded beforehand in a multi-layer optical information recording medium having at least a recordable first information layer and a second information layer at the back of the first one with respect to the laser incidence side. In this case, after signals are recorded in the first information layer, signals are recorded in the second information layer. Then, the signals recorded in the second information layer can be recorded and reproduced stably. However, signals are not necessarily recorded in the second information layer after signals are recorded in the first information layer in all the recordable regions. A necessary point is that when signals are recorded in a region in the second information layer, signals have to be recorded in the first information layer at the front of the region in the second one. Then, in this embodiment, when signals are recorded in a two-layer optical information recording medium, they are recorded only if signals have been recorded in the first information layer located before the laser incident position of the second one.

Figure 5:
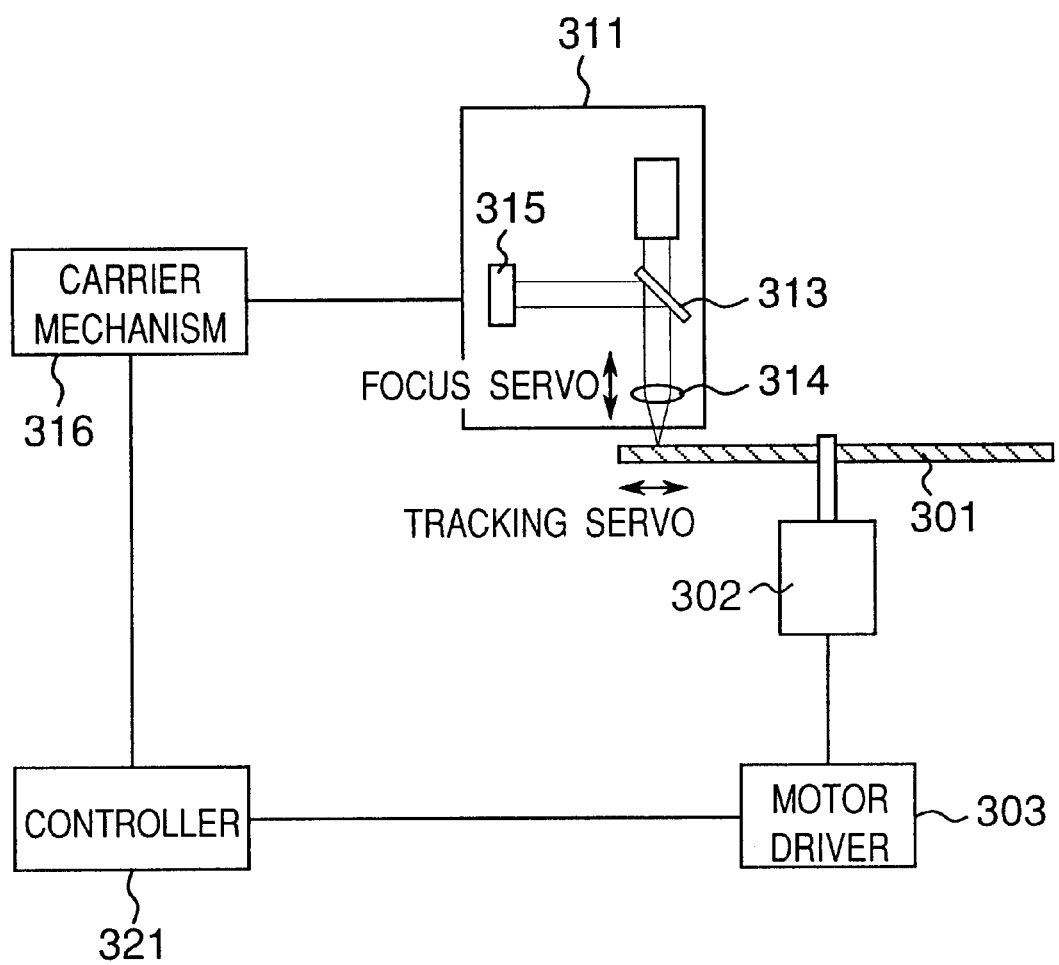
FIG. 5 is a diagram of a recording and reproducing apparatus for an optical disk.

FIG. 5 shows a recording and reproduction apparatus. An optical disk is rotated by a spindle motor 302, and a motor driver 303 drives the spindle motor 302. On the other hand, in an optical head 311 arranged above the optical disk 301, a laser beam emitted from a laser light source 323 for recording and reproduction transmits a half-mirror 313 and propagates through an object lens 314 onto the optical disk 301. A light reflected from the optical disk 301 is reflected by the half-mirror 313 and detected by a photodetector 315. The optical head 311 is driven by a carriage mechanism 316, and performs focus servo and tracking servo for the optical disk 301. A controller 321 having a central processing unit controls the motor driver 302 and the carriage mechanism 316. The above-mentioned structure of the apparatus is the same as a prior one. Further, the controller 321 records signals in the second information layer only if signals have been recorded in the first information layer located before the laser incident position in the second one.

Therefore, when signals are recorded in the second information layer of the recordable multi-layer optical information recording medium, a step is necessary for checking whether signals are recorded in the first information layer located in front of the second one. At least, information on positions where the signals are recorded in the first information layer 2 is recorded somewhere in the relevant multi-layer optical information recording medium.

Figure 6:
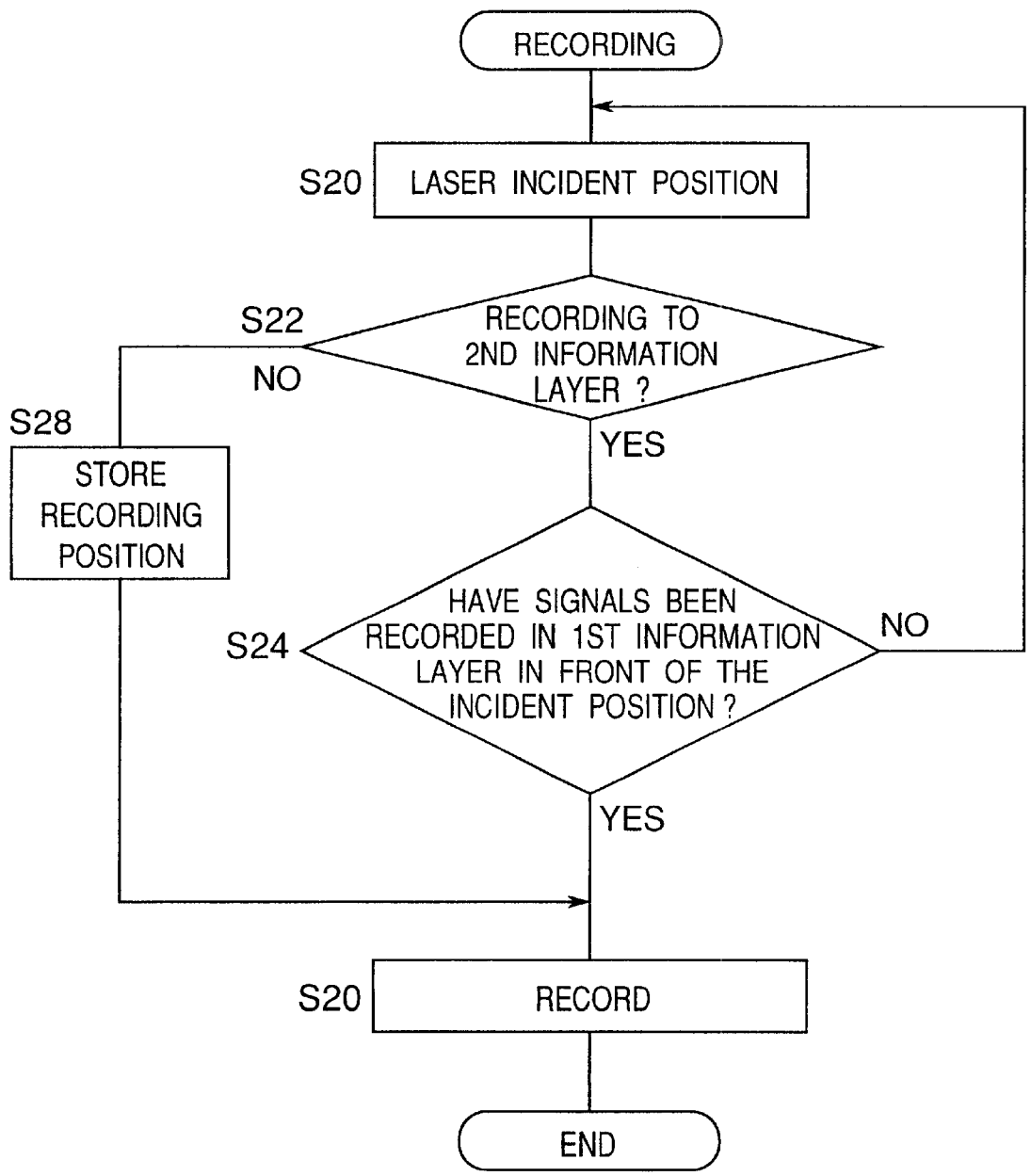
FIG. 6 is a flowchart of recording by a controller.
Figure 7:
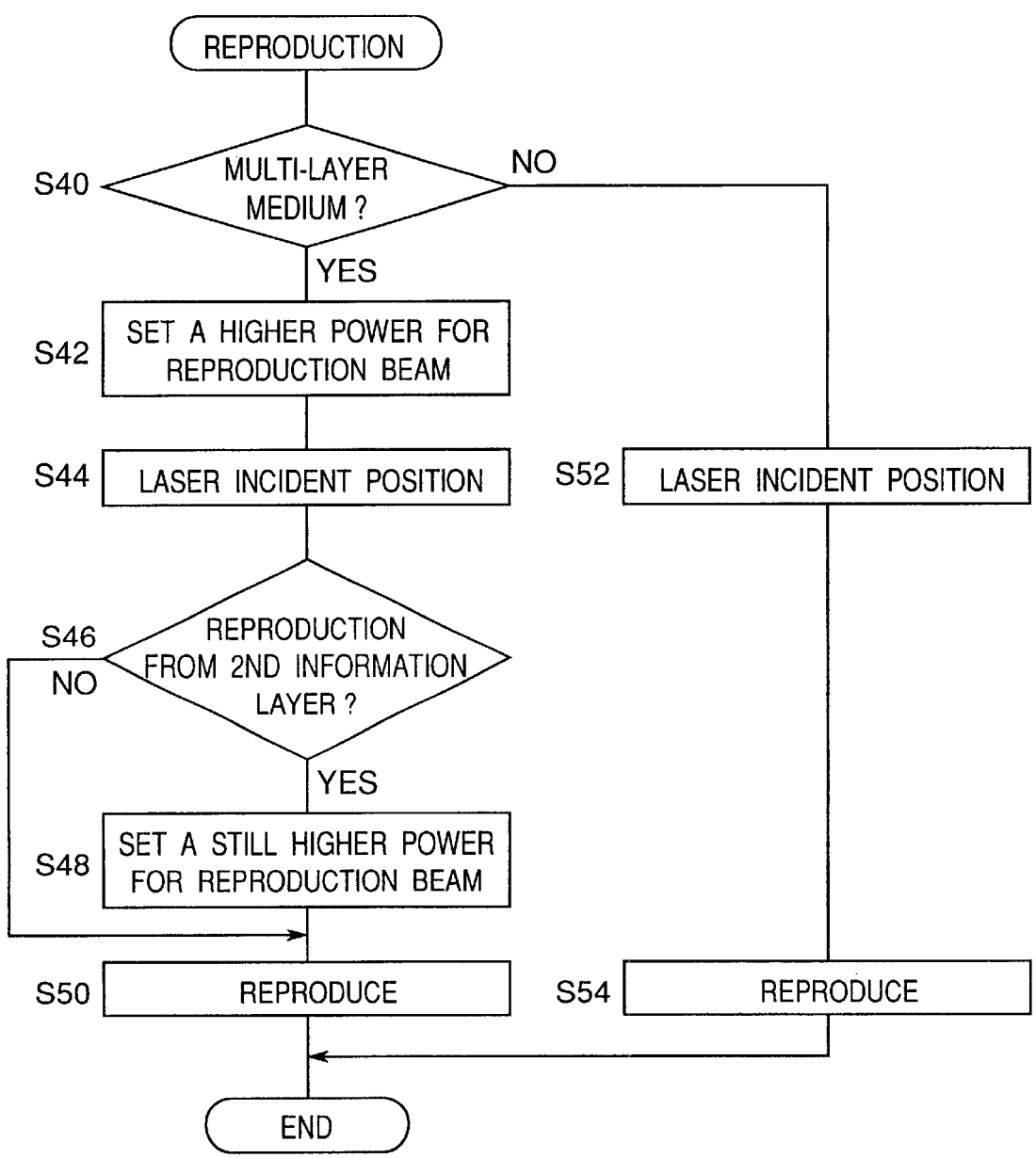
FIG. 7 is a flowchart of reproduction by the controller.

FIG. 6 shows a flow of recording control by the controller 321. First, a laser incident position (recording position) is set (step S20). Then, it is decided based on the laser incident position whether the recording will be performed on the second information layer (step S22). If the recording will be performed on the second information layer, it is decided next whether signals have been recorded in the first information layer located before the laser incident position in the second one (step S24). If it is decided that signals have been recorded in the first information layer located before the laser incident position in the second one, recording is performed at the laser incident position in the second information layer (step S26). If it is decided that signals have not been recorded in the first information layer located before the laser incident position in the second one, the flow returns to step S20, and the above-mentioned processing is repeated on a new incident position. If it is decided that the recording will not be performed on the second information layer at step 22, it is performed on the first information layer. Then, the flow proceeds to step S26 for the recording after the recording position in the first information layer is stored in a predetermined region in the recording medium (step S28).

A multi-layer optical information recording medium, to which this recording method can be applied, may be fabricated with the first and second information layers 2, 4 each formed on the uneven patterns of the substrates 1, 5 and adhered via the optical separation layer 3 to each other. It may also be fabricated by forming the optical separation layer 3 on the first information layer 2 with 2P process or the like, and by forming the second information layer 4 thereon.

Next, a sixth embodiment of the invention is explained. As to a multi-layer optical information recording medium having a recordable first information layer and at least a second information layer at the back of the first one with respect to the laser incidence side, a method is explained to reproduce effectively signals recorded in first and second information layers. As mentioned above, the reproduction amplitude of signals recorded in the second information layer are proportional to a square of the transmittance of the first information layer. Therefore, it is designed that the reflectance of the second information layer is as large as possible and that the transmittance of the first information layer is as large as possible, but they have limits. Because the quantity of reflected light from the recorded signals in the second information layer is small, an effect of signal noises in the driving is large, and a good signal to noise ratio is not obtained.

In order to solve this point, in an optical information reproduction apparatus of the embodiment, when signals recorded in the second information layer at the back of the first one are reproduced, the power of the reproduction light is larger than the counterpart when signals recorded in the first one are reproduced. (Of course, the apparatus can also record signals.) According to the reproduction apparatus, the amplitude of the reproduction signals from the first information layer can be matched about the same as that from the second information layer. Alternately, the quantity of the reflection light from the first information layer can be matched about the same as that from the second information layer. Anyway, the invention has a large advantage for a multi-layer optical information recording medium where the S/N ratio of the second information layer is smaller than that of the first information layer if the power of the reproduction light is kept the same. Further, it becomes possible to match the S/N ratio of the first information layer about the same as that of the second information layer. The upper limit of the power of the reproduction light is determined from a viewpoint of power that does not deteriorate the signals recorded in each layer with the reproduction light, besides the allowable output value of the laser. The reproduction method of optical information for realizing the embodiment has a step for deciding whether the layer under reproduction is the first information layer or the second information layer, and a step for increasing the power of reproduction light if the information to be reproduced is determined to be on the second information layer.

Similarly, for an optical information reproduction apparatus, which can reproduce both a read-only optical information recording medium and a recordable multi-layer optical information recording medium, it is very advantageous from a viewpoint of good reproduction of signals recorded in the two media that the power of reproduction light is larger for a recordable multi-layer optical information recording medium than for a read only optical information recording medium. (Of course, the apparatus can also record signals.) This is because the quantity of reflected light from each layer in the multi-layer optical information recording medium is usually smaller for a recordable multi-layer optical information recording medium than for a read-only optical information recording medium. A reproduction method of optical information for realizing the embodiment has a step for deciding whether the layer under reproduction is in a read-only optical information recording medium having higher reflectance or a recordable multi-layer optical information recording medium having lower reflectance, and a step for increasing the power of reproduction light if the multi-layer optical information recording medium is decided to be reproduced.

As explained above, the recording and reproduction method and the apparatus of optical information according to the invention can record and reproduce (or erase in some cases) signals to and from an optical information recording medium other than the multi-layer optical information recording medium according to the invention, such as a read-only optical information recording medium or a rewriteable optical disk having a single layer structure. Therefore, it is desirable that a discriminator for discriminating the multi-layer optical information recording medium according to the invention be provided in a predetermined region in at least one of the first or second information layer 2, 4. By reading the information recorded in the discrimination area, recording and reproduction (and erasing in some cases) are controlled according to the kind of the optical information recording medium. The discrimination area in the optical information recording medium is provided for example in an inner or outer periphery of the lead-in area. It is preferable that the discrimination region be provided in the lead-in area in the inner periphery of the first information layer.

The embodiments of the invention will be explained further in detail with reference to examples.

When an optical information recording medium is fabricated, a first substrate made of polycarbonate having radius of 120 mm and thickness of 0.58 mm is provided. It is covered with guide grooves of pitch of 0.60 $\mu$m and grove depth of 70 nm. Then, a protection layer of ZnS—20 mol % SiO$_2$, a recording layer of Ge$_{29}$SB$_{21}$Te$_{50}$, and another protection layer of ZnS—20 mol % SiO$_2$ of thickness of 100, 7 and 110 nm are formed as a first information layer 102 on the first substrate successively with a magnetron sputtering processes. Similarly, a second substrate made of polycarbonate having radius of 120 mm and thickness of 0.6 mm is covered with guide grooves of pitch of 0.60 $\mu$m and groove depth of 70 nm. Then, a semi-transparent layer of Al—2 at % Cr, a protection layer of ZnS—20 mol % SiO$_2$, a recording layer of Ge$_{29}$Sb$_{21}$Te$_{50}$, another protection layer of ZnS—20 mol % SiO$_2$ and a reflection layer of Au of thicknesses of 16, 80, 10, 70 and 10 nm are formed as a second information layer 106 on the second substrate successively with magnetron sputtering processes. The groove widths of the first and second substrates 101, 107 are selected so that signals recorded on the grooves are reproduced at the same amplitudes as those recorded between the grooves. Usually, the groove widths of the first and second substrates are different from each other.

After the first information layer 102 is deposited, an acrylic ultraviolet-ray setting resin is applied to the film surface with spin coating to thickness of 5 $\mu$m. Then, it is set with irradiation of ultraviolet rays. Similarly, after the second information layer is deposited, an acrylic ultraviolet-ray setting resin is applied to the film surface with spin coating to thickness of 5 $\mu$m. Then, it is set with irradiation of ultraviolet rays.

Figure 8:
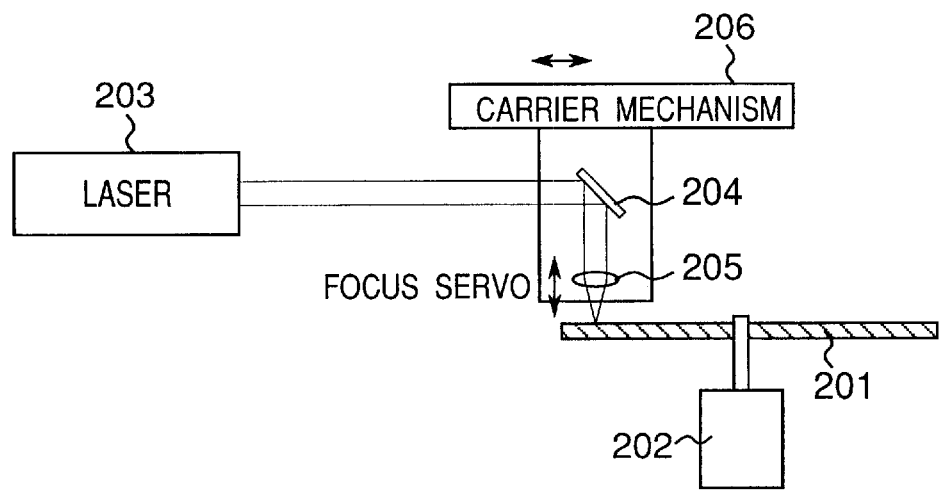
FIG. 8 is a diagram of an initial crystallization apparatus for an optical disk.

By using an initial crystallization apparatus shown in FIG. 8, for each of the first and second information layers 102, 106 subjected to the overcoating, the recording layers (Ge—Sb—Te thin films) therein are crystallized. In the initial crystallization apparatus, a substrate 201 having an information layer covered with an overcoat layer is rotated by a spindle motor 202. A laser light from a laser light source for the initialization is reflected by a mirror 204 and irradiates the substrate 201 (and the information layer therein) through an object lens 205. An optical head including the mirror 204 and the object lens 205 is moved by a carriage mechanism 206 above the substrate 201 under focus servo control.

The first information layer 102 can be irradiated to crystallize the recording material through the first substrate 102 or through the overcoat layer 103. However, the second information layer 106 can be irradiated to crystallize the recording material only through the overcoat layer 105. If the laser beam irradiates through the second substrate 107, a large part of the laser beam is absorbed or reflected by the Al—Cr reflection layer, and a sufficient quantity of light does not propagate to the recording layer.

On the overcoat layer 105 of the second information layers 106 after the initial crystallization, an epoxy ultraviolet-ray setting resin is coated to a thickness of 30 $\mu$m with spin coating. Then, the first information layer 102 is put on the second information layers 106 so as to oppose the overcoat layers 105 thereof Then, ultraviolet rays are irradiated thereon. Thus, the optical disk has a structure where the first substrate, the first information layer, the overcoat layer, the intermediate resin layer, the other overcoat layer, the second information layer and the second substrate are layered successively. In this example, the second substrate 107 is a protection substrate.

In the optical disks, the crystalline state of the recording material is taken as a non-recorded state, and the amorphous state is taken as a recorded mark. Table 1 shows design values of optical characteristics at a wavelength of 650 $\mu$m, and Table 2 shows measured values, wherein the optical characteristics are measured by using a substrate with a specular plane without guide grooves in order to remove influence of diffraction due to grooves.

According to values of the reflectance and the transmittance shown in Tables 1 and 2, it is guessed that the fabricated optical disk has optical characteristics as designed. It is to be noted that when the second information layer is reproduced from the disk after the adhesion, the effective reflectance of the second information layer is the reflectance of the first information layer times a square of the transmittance of the first information layer, due to the existence of the first information layer in front of the second one. For example, if no recording is performed on the first information, the reflectance of the second information layer not recorded is only 38%*45%*45%=8%.

TABLE 1

Design values of optical characteristics at wavelength of 650 μm

|  | 1st information layer (before contact) | 2nd information layer (before contact) |
|---|---|---|
| Reflectance (amorphous) | 2% | 37% |
| Reflectance (crystalline) | 11% | 13% |
| Transmittance (amorphous) | 70% | — |
| Transmittance (cyrstalline) | 45% | — |
| Absorptance of recording layer (amrophous) | 28% | 35% |
| Absorptance of recording layer (crystalline) | 46% | 65% |
| Phase difference in reflecting light (cryst. - amor.) | 15 degrees | 11 degrees |

TABLE 2

Measured values of optical characteristics at wavelength of 650 μm

|  | 1st information layer (before contact) | 2nd information layer (before contact) |
|---|---|---|
| Reflectance (as deposited) | 3% | 37% |
| Reflectance (crystalline) | 10% | 15% |
| Absorptance of recording layer (as deposited) | 70% | — |
| Absorptance of recording layer (crystalline) | 45% | — |

By using the recording and reproduction apparatus shown in FIG. 5, signals are recorded to and reproduced from guide grooves (hereinafter referred to as groove) and regions between the guide grooves (hereinafter referred to as land). The laser light source 323 used for recording and reproduction is a laser diode of wavelength of 650 nm, and numerical aperture of the object lens is 0.6. Information to be recorded is recorded with modulation of 8/16 RLL (2, 10). The recording linear velocity is 8 m/s, and linear density of recording signals is 0.31 μm/bit. If the duty ratio of recording pulse is set to 50%, signals are overwritten to the first information layer and to the second one by using peak power of 13 mW.

Figure 9:
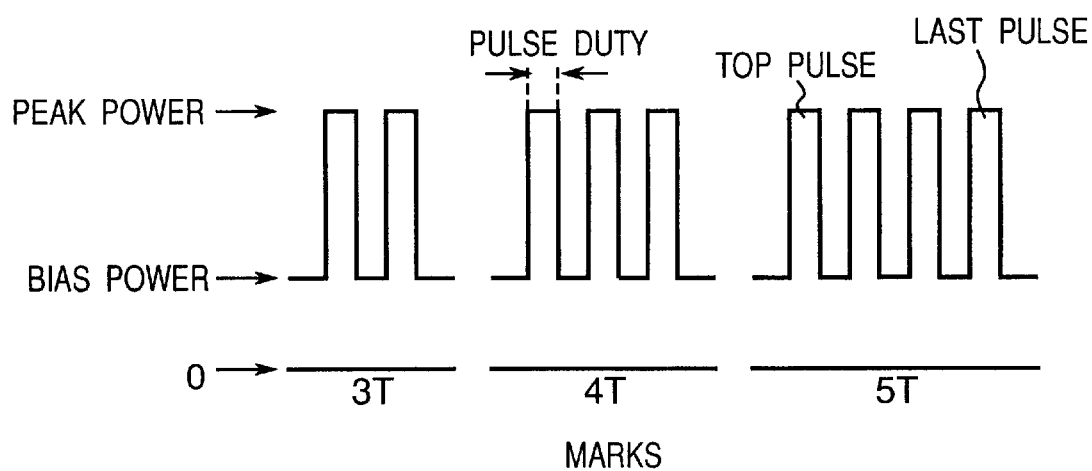
FIG. 9 is a timing chart of modulation waveform of recording pulses when information is recorded in an optical disk.

FIG. 9 shows modulation waveform of recording pulses. The shape of the top pulse on recording is determined as an adaptive type so that reproduction jitters become minimum according to the length of a symmetric mark and a distance thereof to a mark recorded before the symmetric mark. Further, the shape of the last pulse on recording is determined as an adaptive type so that reproduction jitters become minimum according to the length of a symmetric mark and a distance thereof to a mark recorded next to the symmetric mark.

Table 3 shows recording conditions and reproduction characteristics. However, when signals are recorded in the second information layer, signals are recorded beforehand at the grooves and the lands of the first information layer at the front side for positions for recording in the second information layer. It is to be noted in Table 3 that reference signs "G" and "L" denotes recording characteristics for the groove and for the land and "O/W" denotes overwrite recording.

TABLE 3

Recording conditions and reproduction characteristics

| Conditions of recording And reproduction | 1st information layer (G/L) | 2nd information layer (G/L) |
|---|---|---|
| Recording power (mW) (Pp-Pb) | 12.5–6.0/ 12.5–6.0 | 13.0–6.0/ 13.0–6.0 |
| (Reproduction power 1.0 mW) Reproduction jitters (Recorded once) | 15%/15% | 23%/27% |
| (Reproduction power: 1.5 mW) Reproduction jitters (Recorded once) | 11%/11% | 14%/14% |
| (Reproduction power: 2.0 mW) Reproduction jitters (Recorded once) | 9%/9% | 10%/10% |
| (Reproduction power: 2.5 mW) Reproduction jitter (Recorded once) | 9%/9% | 9%/9% |
| Reproduction jitter (100 times O/W) | 9%/9% | 10%/10% |
| Reproduction jitter ($10^4$ times O/W) | 10%/10% | 10%/11% |
| Reproduction jitters ($10^5$ times O/W) | 10%/10% | 11%/11% |

Table 3 shows that when the reproduction power is sufficiently high, signals recorded both on the grooves and on the lands of the first and second information layers can be reproduced at good jitter values. The minimum reproduction power having the minimum reproduction jitters is 2.0 mW for the first information layer and 2.5 mW for the second information layer. Needless to say, the absolute values thereof depend on the amplitudes of noises in the circuit of the recording and reproduction apparatus and the optical system in the reproduction apparatus.

Further, it is found that the reproduction jitters are not practically deteriorated. However, for an optical disk where the first and/or second information layers are adhered after being exposed to air without overcoating, jitters increase to a large extent at the repetition recording of 1,000 times even if the initialization is optimized in various ways. Then, when the initialization is performed before adhesion, it is desirable that the initialization is performed after providing the overcoat layer.

Further, for the first information layer in the disk, the disk structure is investigated by changing the film thickness of the first information layer. It is found that when the film thickness of the first information layer is thinner than 5 nm, the reproduction signal amplitude and erasing characteristic are extremely deteriorated or that the characteristic as a recording medium is insufficient. Further, it is also found that when the film thickness of the first information layer is thicker than 10 nm, the average transmittance becomes equal to or smaller than 50%. Thus signals are not recorded with good sensitivity in the second information layer, and the reproduction signal amplitude of the second information layer cannot be increased.

In a next example, in order to improve the repetition recording characteristic of the first and second information layers in the disk of the first example, an interface layer made of a nitride is provided adjacent to the recording thin film. In the experiment, a nitride interface layer of 5 nm of thickness made of various nitrides is inserted between the first or second information layer and a ZnS—20 mol % $SiO_2$ protection layer, and the repetition recording characteristic is investigated. The nitride materials under study for the interface layer are Al—N, Is—N, Ti—N, Cr—N, Ge—N and Ti—N. All the nitride interface layers are prepared with magnetron sputtering.

As an example, Table 4 shows a relationship between the repetition recording times and reproduction jitters when Ge—N interface layers of 5 nm of thickness are provided at both sides of the recording material in the first information layer and in the second information layer.

TABLE 4

Relationship between the repetition recording times and reproduction jitters

| Conditions of recording and reproduction | 1st information layer (G/L) | 2nd information layer (G/L) |
| --- | --- | --- |
| Recording power (mW) | 12.5–6.0/ | 13.0–6.0/ |
| (Pp-Pb) | 12.5–6.0 | 13.0–6.0 |
| (Reproduction power: 2.5 mW) Reproduction jitters (Recorded once) | 9%/9% | 9%/9% |
| Reproduction jitters (100 times Q/W) | 9%/9% | 10%/10% |
| Reproduction jitters ($10^4$ times O/W) | 10%/10% | 10%/11% |
| Reproduction jitters ($10^5$ times O/W) | 10%/10% | 11%/11% |

Following points are clear from the experimental results. 1) At any nitride interface layer, the repetition number of recording of the first and second information layers (the repetition number of recording until the reproduction jitters in ten times repetition of recording is deteriorated by 1% or more) is extended twice or more than the counterpart without the nitride interface layers. 2) The nitride interface layer can improve the repetition number of recording both when the nitride interface layer is provided on the recording layer both at the incident side of the laser beam and at the interface of the recording thin film at the opposite side. The advantage is maximum when the nitride interface layers are provided at the two sides of the recording layer.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An optical information recording medium comprising:
   a first information layer including a first recording layer whose phase is reversibly changeable between a crystalline state and an amorphous state by exposure to a light beam, said first recording layer having a reflectance $R1c$ when in the crystalline state, said first recording layer having a reflectance $R1a$ when in the amorphous state; and
   a second information layer including a second recording layer whose phase is reversibly changeable between a crystalline state and an amorphous state by exposure to the light beam, said second recording layer having a reflectance $R2c$ when in the crystalline state, said second recording layer having a reflectance $R2a$ when in the amorphous state,
   wherein $R1a<R1c$ and $R2a>R2c$.

2. The optical information recording medium according to claim 1, wherein
   said first recording layer has an absorptance $A1c$ when in the crystalline state, said first recording layer said an absorptance $A1a$ when in the amorphous state, and wherein $A1a<A1c$.

3. The optical information recording medium according to claim 1, wherein
   said second recording layer has an absorptance $A2c$ when in the crystalline state, said second recording layer has an absorptance $A2a$ when in the amorphous state, and wherein $A2a<A2c$.

4. The optical information recording medium according to claim 1, further comprising a transparent layer, which transmits the light beam, arranged between said first and said second information layers.

5. The optical information recording medium according to claim 4, further comprising an overcoat layer arranged between said transparent layer and said first information layer.

6. The optical information recording medium according to claim 5, wherein said overcoat layer is made of an acrylic resin and said transparent layer is made of an epoxy resin.

7. The optical information recording medium according to claim 4, further comprising an overcoat layer arranged between said transparent layer and said second information layer.

8. The optical information recording medium according to claim 7, wherein said overcoat layer is made of an acrylic resin and said transparent layer is made of an epoxy resin.

9. The optical information recording medium according to claim 1, wherein said first recording layer includes a region having previously recorded marks formed thereon.

10. The optical information recording medium according to claim 9, wherein a percentage of the area of the recorded marks formed in the region of said first information layer per unit area is between 20 and 50.

11. The optical information recording medium according to claim 1, wherein a thickness of said first recording layer is between 5 and 9 nm.

12. The optical information recording medium according to claim 1, wherein said first recording layer comprises germanium, antimony and tellurium.

13. The optical information recording medium according to claim 1, wherein said first information layer further includes a first dielectric layer, a second dielectric layer and an interface layer, said interface layer is made of nitride or carbide,
   wherein said first recording material is interposed between said first dielectric layer and said second dielectric layer, and
   wherein said interface layer is interposed between said first recording layer and said first dielectric layer.

14. The optical information recording medium according to claim 1, wherein said first information layer further includes a first dielectric layer, a second dielectric layer and an interface layer, and said interface layer is made of nitride or carbide,
   wherein said first recording material is interposed between said first dielectric layer and said second dielectric layer, and
   wherein said interface layer is interposed between said first recording layer and said second dielectric layer.

15. The optical information recording medium according to claim 1, wherein at least one of said first information layer and said second information layer has a region where information on recorded data in said first information layer and said second information layers is recorded.

16. An optical information recording medium comprising:
  a first information layer including a first recording layer whose phase is reversibly changeable between a crystalline state and an amorphous state by exposure to a light beam, said first recording layer having an absorptance $A1c$ when in the crystalline state, said first recording layer having an absorptance $A1a$ when in the amorphous state; and
  a second information layer including a second recording layer whose phase is reversibly changeable between a crystalline state and an amorphous state by exposure to the light beam, said second recording layer having an absorptance $A2c$ when in the crystalline state, said second recording layer having an absorptance $A2a$ when in the amorphous state,
  wherein $A1a<A1c$ and $A2a<A2c$.

17. The optical information recording medium according to claim 16, wherein said first recording layer has a reflectance $R1c$ when in the crystalline state, said first recording layer has a reflectance $R1a$ when in the amorphous state, and
  wherein $R1a<R1c$.

18. The optical information recording medium according to claim 16, wherein said second recording layer has a reflectance $R2c$ when in the crystalline state, said second recording layer has a reflectance $R2a$ when in the amorphous state, and
  wherein $R2a>R2c$.

19. An optical information recording medium comprising:
  a first recording layer to which information can be recorded by exposure to a first light beam, said first recording layer including a non-recorded region having pre-recorded marks formed thereon and a recording region not having pre-recorded marks formed thereon; and
  a second recording layer to which information can be recorded by exposure to a second light beam which transmits through said first recording layer,
  wherein said recording region is capable of having recorded marks, which correspond to the information to be recorded by exposure to the first light beam, formed thereon,
  wherein said non-recorded region has a transmittance substantially the same as said recording region, and
  wherein a total area of said non-recorded region is at least 20 percent of a total area of said recording region.

20. The optical information recording medium of claim 19, wherein the total area of said non-recorded region is more than 20 percent, but less than 50 percent, of the total area of said recording region.

* * * * *